Dec. 14, 1948.   J. W. GILL   2,456,269
PLASTIC JOINT COMPOSITION
Filed Dec. 1, 1944
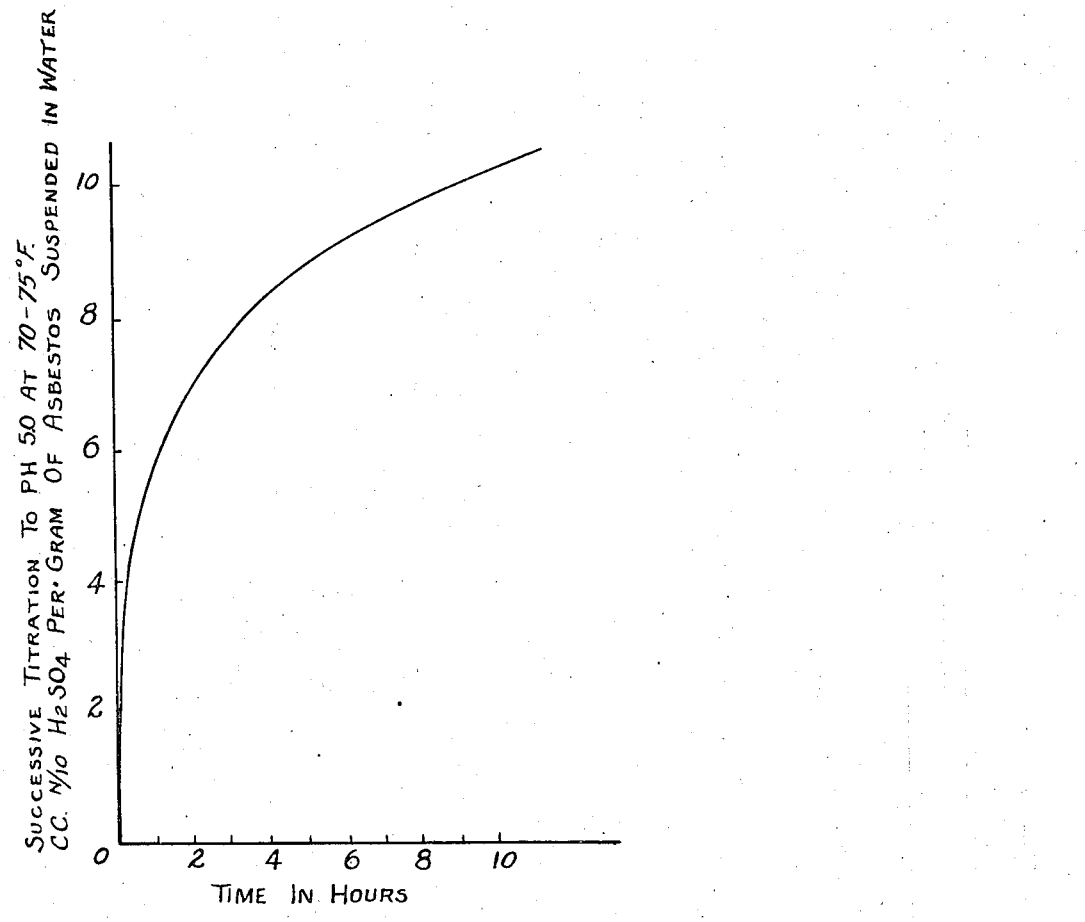
Joseph W. Gill   INVENTOR.
BY P. B. Slisz Patented Dec. 14, 1948

2,456,269

UNITED STATES PATENT OFFICE 2,456,269

PLASTIC JOINT COMPOSITION

Joseph W. Gill, Elmhurst, Ill., assignor to United States Gypsum Company, Chicago, Ill., a corporation of Illinois Application December 1, 1944, Serial No. 566,230

5 Claims. (Cl. 106—113)

This invention pertains to a new and improved type of plastic composition particularly adapted for use as a joint filler or treatment in connection with a reenforcing strip or tape placed over a joint between abutting wallboards. Though it can be used with all types of wallboard panels to obtain a monolithic appearing surface construction, it is specifically directed to the gypsum wallboard art.

The better type of gypsum wallboard, for example such as Sheetrock, made by the United States Gypsum Company, have a very slight depression on the face thereof along the marginal portions of the longitudinal edges. This depression is of such a width and depth that when the edge is butted with another similarly recessed edge, a joint tape will fit snugly within the formed recess. Tapes of various materials such as perforated metal, cloth and paper, have been used, but it is preferred to use the tape shown and described more fully in the Page Patent Number 2,047,982. In addition to joints formed by the abutting vertical and horizontal edges of wallboard, there are a number of corners and other places in each room where the wallboard is cut and fitted into place, to form joints that require finishing with a tape and a cement to produce a smooth appearing surface.

In finishing the joints formed by abutting edges of wallboard, the edges are first firmly secured in place with nails or other fastening means to the underlying support such as a stud. A suitable composition or a cement is then prepared by blending a dry cementitious mass such as that described in this disclosure with enough water to make a soft, readily spreadable putty. This putty is applied to the joint and to the adjacent area and forced into the joint crevice by means of a broad knife. A paper tape such as that disclosed by the aforesaid Page patent, or a metal tape such as shown in the Green Patent No. 1,703,667 is embedded in the plastic cement applied into and about the joint until it is properly seated over the joint. The excess cement oozes through the perforations within the tape and about the tapered edges of the said tape. The excess cement is scraped off with a broad putty knife, while the balance firmly bonds the tape to the board.

A broad knife is particularly suitable for its breadth spans the recess or the joint and "feathers out" or thins the margins of the applied cement to an extremely thin coat. This is desirable for the cement coat over the joint gradually thins down in thickness and almost imperceptibly merges into the general surface area of the wallboard. In order to do a craftsman-like application and to eliminate shrinkage cracks it is desirable to apply a second and perhaps even a third coat of a thinned down cement over the joint. If this practice is followed then it is desirable to sand the surface of the applied and hardened cement between applications to obtain a still smoother surface effect. A perfect joint when properly done, will not be noticeable when a decorative coating like an oil paint or still better a water paint is applied over the surface of the wallboard and joint.

The growth of the use of water paints in the last few years has been phenomenal. Its outstanding characteristics of ease of application, good coverage and, in general, its excellent hiding power has prompted its wide spread use by not only the artisan but also the general consumer. However its use over joint treatments in which cementitious compositions, containing a cold water soluble glue are employed as the principal adhesive, has not always been a success, particularly in those areas where temperature and humidities are often high and this is particularly true when so-called texture paints which are applied in a heavier coat so that various patterns and designs may be set up in the surface. These remain in a plastic condition for a relatively longer time and the water contained therein has an opportunity to soak into the joint composition and to soften up the cement.

When glue bonded joint cements, based on a glue which is readily soluble in cold water, are used in finishing such wallboard joints and a water thinned paint, particularly a texture paint, is applied to the wall surface the moisture from such paint will rapidly soften the joint cement. Such softening will at times be sufficiently rapid in action and severe enough that the joint cement will brush up or otherwise work up into the paint instead of remaining in place as the smooth wall surface to receive the wall decoration.

Another deficiency of the glue bonded cements in which no glue gelling agent is included is the tendency for the glue to bleed to the surface in drying, leaving the under layers deficient in glue and too weak to adequately bond the tape to the wallboard.

It therefore is one of the many objects of this invention to provide a new and improved type of a cementitious composition suitable for joint treatment that will not too readily soften under the influence of moisture present in water thinned paints, decorative coatings applied over it, or otherwise inadvertently or accidentally spilled on the joint surface.

These and other objects, adaptions, modifications and variations will be quite obvious to one skilled in this art, in view of the detailed disclosure given hereinbelow, but which nevertheless still are within the scope and ambit of the fundamental and basic concepts underlying the spirit of this invention. The examples below will provide a clear and definite illustration of the underlying principles involved but are not intended to be a limitation of this invention except as it is defined in the appended claims.

In the preparation of the new composition within the spirit and scope of the fundamental principles underlying this invention, four classes of material must be suitably employed in order to arrive at the desired result. Though as mentioned previously the formulas below are for examplary purposes only, it is obvious that these can be varied by one skilled in the art. Further and in order to define more clearly these principles underlying the new and improved joint system cementitious composition each of the principal classes of materials will be discussed sufficiently to point out specifically their functions.

The invention comprises essentially (1) a water soluble glue of animal origin, (2) a glue tanning or waterproofing reagent, (3) a source of slowly liberatable alkali and (4) plastic fillers. The above materials when properly combined and prepared in accordance with the disclosure given below will yield the new and improved composition of this invention.

Glue is the first essential ingredient of this composition. It is the prime adhesive binder of the cement. The preferred type is an animal bone or hide glue. This glue should be very readily soluble in water at room temperatures. The so-called cold water grades of bone or hide glue are readily soluble in water and are used in the preparation of the composition of this invention. Casein glues, though of an animal origin, are not suitable since commercial casein is not readily soluble in cold water without the addition of strong alkalies.

The second essential ingredient is a waterproofing or tanning agent for the glue in order to fix it and prevent its further resolubility when exposed to moisture. One of the essential characteristics and functions of this reagent in the improved composition is its ability to remain inert while packaged in the dry state. Paraldehyde, hexamethylenetetramine and other such solids of an organic nature are not suitable for they exert a vapor pressure and eventually in time will render the glue in the dry composition more or less insoluble, valueless and useless.

It has been found, however, that the inorganic types of glue insolubilizers and tanning agents such as the water soluble, non-hygroscopic chromic compounds like chrome alum, basic chrome sulfate, chromic fluoride etc. can be used. For most efficient results as well as reasonably good keeping qualities, the commercial chrome sulfate tanning agents are very useful. Such chrome compounds usually comprise chrome sulfate in combination with an alkali sulfate. Some of these compounds are typified by the chrome alums, others by the more or less indefinite combination known commercially under various trade names, and which comprise a basic chromic sulfate plus sodium sulfate. These reagents are more or less acidic in character, which not only assists in the tanning action, but also acts as a set accelerator when calcium sulfate hemihydrate is used in the composition. Further, these compounds should be readily soluble in water and if necessary ground to such a degree of fineness, that the particles are completely dissolved within a short time of a few minutes. In all cases, however, it is necessary that the chromium in the salts, compounds, etc. used herein be in the chromic state.

The third essential ingredient is asbestos, or similarly chemically related minerals such as serpentine rock, brucite, etc. It not only imparts useful working and application qualities, but at the same time is a source of slowly liberated alkalinity that neutralizes the acidity of the chrome tan or alum. By neutralizing the acidity, the accelerating influence on the stucco is restricted, the tendency to liberate $CO_2$ from any carbonate impurities in the fillers, the tendency of this cement to rust or corrode metal tools and nails, and the tendency to exert a weakening action on the paper of the board or tape (due to acidity) is reduced. With a suitable asbestos fiber used in the improved composition, together with the other essential ingredients a final hydrogen ion concentration of 6.5 may be obtained in the wet, mixed cement 30 minutes or less after mixing with water. This is approximately the optimum acidity to develop the best working and application qualities.

The attached chart forming a part of this specification shows the effect of the slowly liberated alkalinity by the asbestor fibers. It shows that when the asbestos fiber, in this particular case, 7 RF fines, are neutralized at a pH 5.0, with a N. 1/10 sulfuric acid, that even at the end of 10 hours under the conditions specified in the chart, the residual alkalinity is quite pronounced. Thus for many hours, while the chrome tan exerts its tanning influence on the glue, the excess acidity is neutralized, and a substantially neutral condition is maintained. Excess acidity (below pH 5.0) weakens and rapidly deteriorates with age the cellulose fibers in the cover sheets of the gypsum wallboard and the paper tape.

The term 7 RF fines, as used, defines an asbestos fibre of a certain particle size as tested in accord with the official test methods of Quebec Asbestos Producers as described on pages 69 to 71 in the United States Bureau of Mines Bulletin 403 issued in 1937.

The fourth essential ingredient is the filler. Most commercially non-carbonate fillers contain at least a small quantity of some carbonate. Under the influence of the acid formed by the dissociation of the chrome tanning agent and its action on the glue, the carbon dioxide may be liberated from the carbonate and form pores or gas bubbles in the cement. These are objectionable for a number of reasons especially that a smooth surface is not obtained. Hence it is preferable to use fillers of relatively low carbonate content, and particularly low in the readily reactive $CaCO_3$. The fillers selected constitute the major portion by weight of the composition and are largely responsible for the working and application qualities of the final product.

The term plastic filler as used in this specification connotes mineral fillers which impart good working properties to the cement at the time of application to the surface of the joint.

In selecting fillers, it is desirable that some type of a hydraulic cement be included as a part of the filler combination. Some of these like calcium sulfate hemihydrate possess extremely desirable and useful properties. The calcium sulfate hemihydrate or stucco, which has been ground finely in tube mills is desirable for it possesses suitably enhanced plastic working qualities. The setting time of this stucco can be varied over wide limits in cements of this type under the influence of such salts as alum. A low shrinking substantial joint base and spackling cement for use over the embedded reenforcing tape is obtained.

Other property modifying fillers such as pyrophyllite, china clay, finely ground silica etc. can be added to further minimize shrinkage, assist in increasing working and application qualities and otherwise in general improve the texture and strength in the final cementitious composition as applied over the joint.

It has also been found advantageous to incorporate a small amount of a carbohydrate adhesive such as sold under the names of K-B paste, "Amijel" etc. K-B paste, "Amijel," etc., are made by passing dry corn starch between heated rollers. These carbohydrate adhesives are readily soluble in cold water but are so processed commercially that apparently they do not influence the glue bond or the glue tanning action. These carbohydrate adhesives in the amounts used impart but little more adhesiveness to the paper joint reenforcing tape, and are included mainly for beneficial effect on working and application qualities.

The formulas given below indicate the preferred formulation and the approximate ranges in which the materials can be used without departing from the fundamental principles underlying this invention:

|  | Preferred Formula | Limiting Ranges |
|---|---|---|
|  | Per cent | Per cent |
| Glue | 3.0 | 2.0–10.0 |
| Corn paste (K-B paste or "Amigel") | 1.4 | 0 – 5 |
| Chrome tan (25% $Cr_2O_3$) | 0.6 | .2– 2.0 |
| Asbestos floats | 4.0 | 2.0–10.0 |
| Fine ground Pyrophyllite | 20.0 | 0 –30 |
| Fine ground silica | 15.0 | 0 –30 |
| Stucco—low consistency, plastic working | 56.0 | [1] Balance |

[1] In general 50% or more of the stucco is desirable though cements containing 40% or less stucco can be compounded when the stucco is highly plastic.

Though for convenience the chrome tan, known also as basic chromic sulfate, is expressed as a compound present in the range of .2 to 2.0 per cent, nevertheless it can be more simply stated that the chromium is present as the trivalent chromic ion in the quantity of 0.035 to 0.35 per cent. The amount is readily computed by conversion of the percentages expressed, i. e., 0.2 to 2.0 per cent to the common unit of chromium metal by the use of proper stoichiometrical factor. The amount of a chromium salt present in the composition as water soluble trivalent chromium salt can be thus readily determined and become a simple chemical calculation.

Another type of a preferred formula containing no hydraulically setting material such as calcined gypsum is illustrated by the example given below:

| | Percent |
|---|---|
| Cold water glue | 3.5 |
| Chrome tan (25% $Cr_2O_3$) | 0.6 |
| Asbestos (floats) | 4.0 |
| China clay | 51.9 |
| Mica (substantially thru 80 mesh sieve) | 10.0 |
| Silica (finely ground) | 20.0 |
| Pyrophyllite | 10.0 |
| | 100.0 |

The above composition when blended with sufficient water to make a soft, spreadable putty, possesses excellent working and application qualities, low shrinkage and good water resistance. It is slightly less hard than the formula containing the hydraulically setting stucco, but it can be used successfully. It illustrates another type of a plastic filler ingredient.

Silica, pyrophyllite, mica etc. are types of non-plastic fillers. Their use is desirable for they reduce shrinkage and cracking and add a degree of firmness in the final set and dry product.

In practice the prepared composition is blended with sufficient water until a smooth, soft pasty-like putty is obtained. This material is then spread over the joint and the reenforcing tape embedded therein. When dry the surface is carefully sanded until smooth. A second and even a third coat may be applied if necessary, until a smooth, very gradually merging into the plane of the wallboard, joint covered surface is obtained. This surface can be subsequently decorated with all types of decorative media, including water thinned paints with minimum danger of the soluble glue adhesive, "bleeding" thru the decorative coating. This action is eliminated for the water soluble glue adhesive present in the composition is sufficiently tanned by the basic chrome sulfate that it will not be redissolved by the water contained not only in the subsequent applications of the joint treatment but also contained in the water thinned decorative media, such as casein bonded water paints like Texolite, Kalsomine, etc.

Essentially this invention comprises a glue, a chrome tan to render said glue waterproof, a source of slowly liberated alkali such as asbestos to neutralize the acid of the chrome tan, and a plastic filler like calcium sulfate hemihydrate, clay etc. in the quantities and within the limits of the ranges mentioned hereinabove.

Though the above reagents can be varied somewhat within the ranges set forth, it is obvious that a person skilled in this art can substitute other materials and achieve the same result. It, therefore, is not intended to be limited by the specification except as defined in its broadest sense in the hereunto appended claims.

It is claimed:

1. A surfacing and crevice filling composition of matter comprising the following ingredients:

| | Percent |
|---|---|
| Animal glue | 3.0 |
| Corn paste | 1.4 |
| Basic chrome sulfate (25% $Cr_2O_3$) | 0.6 |
| Asbestos floats | 4.0 |
| Finely ground pyrophyllite | 20.0 |
| Finely ground silica | 15.0 |
| Stucco-plastic, low consistency | 56.0 |
| | 100.0 |

2. A surfacing and crevice filling composition of matter comprising:

| | Percent |
|---|---|
| Animal glue | 3.5 |
| Chrome tan (25% $Cr_2O_3$) | 0.6 |
| Asbestos floats | 4.0 |
| China clay | 51.9 |
| Mica | 10.0 |
| Silica | 20.0 |
| Pyrophyllite | 10.0 |
| | 100.0 |

3. A joint treatment composition comprising the following ingredients within the ranges specified:

| | Minimum | Maximum |
|---|---|---|
| | Per cent | Per cent |
| Animal glue | 2.0 | 10.0 |
| Corn paste | 0 | 5.0 |
| Chromium present as water soluble trivalent chromium salt | 0.035 | 0.35 |
| Asbestos | 2.0 | 10.0 |
| Pyrophyllite | 0 | 60.0 |
| Stucco-plastic and low consistency | Balance | Balance |

4. The product of claim 3 wherein the said stucco is present in not less than forty per cent by weight.

5. A joint treatment composition comprising ingredients substantially within the ranges specified:

| | Minimum | Maximum |
|---|---|---|
| | Per cent | Per cent |
| Animal glue | 2.0 | 10.0 |
| Corn paste | 0 | 5.0 |
| Chromium present as water soluble trivalent chromium salt | 0.035 | 0.35 |
| Asbestos | 2.0 | 10.0 |
| Silica | 0 | 30.0 |
| Pyrophyllite | 0 | 30.0 |
| Mica | 5 | 15.0 |
| China Clay | Balance | Balance |

JOSEPH W. GILL.

REFERENCES CITED

The following references are of record in the file of this patent:

UNITED STATES PATENTS

| Number | Name | Date |
|---|---|---|
| 1,123,600 | Sanderson | Jan. 5, 1915 |
| 1,540,922 | Blachorovitch | June 9, 1925 |
| 1,749,508 | Rice | Mar. 4, 1930 |
| 2,046,296 | Roos | June 30, 1936 |
| 2,322,930 | Gardner | June 29, 1943 |

FOREIGN PATENTS

| Number | Country | Date |
|---|---|---|
| 430 | Great Britain | 1907 |
| 28,188 | Australia | 1930 |